United States Patent [19]

Rose

[11] Patent Number: 5,610,609
[45] Date of Patent: Mar. 11, 1997

[54] PASSIVE DOPPLER EMITTER CLASSIFICATION AND RANGING SYSTEM UTILIZING A TIME-FREQUENCY CONSTANT

[75] Inventor: Conrad M. Rose, Dahlgren, Va.

[73] Assignee: Litton Systems, Inc., Woodland Hills, Calif.

[21] Appl. No.: 555,233

[22] Filed: Nov. 8, 1995

[51] Int. Cl.[6] ......................................... G01S 13/72
[52] U.S. Cl. ............................ 342/13; 342/418; 342/99; 342/107; 342/113; 342/115
[58] Field of Search .......................... 342/13, 107, 90, 342/95, 97, 99, 113, 115, 418

[56] References Cited

U.S. PATENT DOCUMENTS

| | | | |
|---|---|---|---|
| 4,040,054 | 8/1977 | Overman | 342/13 |
| 4,146,892 | 3/1979 | Overman et al. | 342/20 |
| 4,209,835 | 6/1980 | Guadagnolo | 342/13 X |
| 4,746,924 | 5/1988 | Lightfoot | 342/453 |
| 5,285,209 | 2/1989 | Sharpin et al. | 342/424 |
| 5,291,199 | 3/1994 | Overman et al. | 342/13 |
| 5,343,212 | 8/1994 | Rose et al. | 342/424 |
| 5,396,250 | 3/1995 | Tsui et al. | 342/13 |
| 5,451,956 | 9/1995 | Lochhead | 342/13 |
| 5,457,466 | 10/1995 | Rose | 342/442 |
| 5,534,866 | 7/1996 | Rose | 342/13 |

Primary Examiner—John B. Sotomayor
Attorney, Agent, or Firm—Gerald L. Lett

[57] ABSTRACT

A method and apparatus for locating a pulse echo radar emitter in both angle and range using a single antenna and minimal use of the observer platform's navigation instruments are described. The emitter's rest frequency and pulse repetition frequencies are extracted. Using the emitter signal DOA and measurements of pulse TOA and emitter frequency, the observer's acceleration and velocity along the emitter DOA path are found. Combining observer velocity with the above kinematic quantities allows emitter range and bearing to be determined. No observer platform heading or angular attitude information is required.

7 Claims, 2 Drawing Sheets

PASSIVE DOPPLER EMITTER CLASSIFICATION AND RANGING SYSTEM UTILIZING A TIME-FREQUENCY CONSTANT

BACKGROUND OF THE INVENTION

This invention relates to the location of pulse echo radar emitters from a moving observer by comparing measured Doppler shifts in the radar's signal. It also relates to the identification and classification of the emitters.

It has been found to be desirable to make both time and frequency measurements on a radar signal in order to locate an emitter in both angle and range. The emitter may be in a mobile system, so that its location varies from day to day, or even hour to hour. The observer may be an unmanned aerial vehicle (UAV) with only a rudimentary navigation system, or alternatively the observer may be a high performance aircraft. Particularly, it is desirable that high performance aircraft be able to update the current emitter location using parameters based on frequency and time measurements made by the UAV or other observer, such as an AWACS aircraft, at some previous time and with the emitter in a different location. Such parameters, if an intrinsic part of the location technique, must not be susceptible to either inadvertent or calculated change by the radar.

To locate emitters from such diverse platforms it is desirable to require little interface with existing systems on a platform and make no modifications to the observer's airframe. In particular, it is desirable to use existing antennas already installed on the airframe and to make minimum demands on information from the aircraft's navigation system.

The use of existing antennas imposes a significant constraint: only a single antenna should be used to make the measurements from which emitter location is derived. This is because if two antennas are required to simultaneously receive signals it is difficult to assure a common field-of-view, and hence coverage around the aircraft can be too restrictive.

U.S. Pat. No. 5,241,313 to Shaw, et al, entitled "Angle of Arrival Measurement via Time Doppler Shift" is of interest, since it describes an emitter location method requiring only one antenna. Although the patent discusses emitter angular location, it is clear that the emitter can be located in range as well, using standard bearings-only passive ranging methods. Shaw, et al, measure the Doppler change associated with radar pulse times-of-arrival (TOA). The emitter angular location is derived after the observer flies precise "dogleg" patterns, with a known speed and heading. But UAVs may not have navigation (NAV) systems that measure velocity with sufficient accuracy to be usable in this approach. UAVs typically measure speed with relatively more precision, but heading may be measured too crudely to provide a basis for extracting signal angle-of-arrival with the accuracy needed for bearings only passive ranging.

The approach of Shaw et al also requires multiple dwells, and signal coherence across these dwells, to obtain a range solution. But when a fire control radar is engaging an attacking aircraft, the radar transmitter may be "blinked", or turned on and off as a defense against anti-radiation missiles. When the radar is blinked, signal coherence can be lost.

SUMMARY OF INVENTION

Therefore, it is an object of this invention to perform passive Doppler location of a pulse echo transmitter, which may be cycled on and off during any part of the ranging process, using signal measurements from a single antenna, but without requiring any NAV system inputs other than observer speed.

It is yet another object of this invention to extract emitter RF carrier rest frequency (27 FIG. 2), and emitter pulse repetition (PRF) rest frequency (28 FIG. 2), where rest frequency refers to the measurement that would be made in a coordinate system at rest with respect to the transmitter. These parameters, important for emitter classification, are extracted from the signal measurements of carrier frequency f (26, FIG. 2) and fundamental time interval between pulses $t_p$ (24, FIG. 2) made on the moving observer, and with no observer NAV inputs at all. Therefore they could be made by an UAV or other vehicle carrying a stand alone system and used subsequently on a different aircraft and at a different time to locate the emitter. As will be seen these parameters are not only intrinsic to the location process, but also serve to identify the emitter as the one the parameters apply to.

Still another object of this invention is to provide time-to-go (TGO) information from the signal measurements. TGO refers to the time it would take the observer to reach the emitter if the velocity that determined the TGO estimate was maintained. This parameter is important for situational awareness, and is also derived with no NAV inputs, other than observer speed.

To achieve these and other objects, this invention describes a method and apparatus for locating an emitter in both angle and range from an observing aircraft. In particular, the invention describes a method and apparatus for extracting emitter rest RF and PRF frequencies, and providing the kinematical quantities observer speed (271, FIG. 2) and acceleration (250, FIG. 2) along the signal direction of arrival (DOA) $\vec{u}$ (284, FIG. 2), using only one essential interface to existing aircraft systems: a connection to a single antenna allowing emitter frequency and pulse time of arrival (TOA) measurements to be made by an ESM intercept receiver. When observer speed is added to the above kinematical quantities, emitter range (281, FIG. 2), and relative bearing (282, FIG. 2) are found. Time-to-go (283, FIG. 2) is found from range and the previously estimated kinematical quantities, and so the invention requires no aircraft heading or angular attitude information whatsoever.

In accomplishing these objects the invention makes use of the method and apparatus in the applicant's commonly assigned patent application entitled "Emitter Frequency-Time Measurement by a Moving Observer Using No Navigation Inputs", Ser. No. 08/499,825 filed Jul. 10, 1995. In particular the measurement of the relativistic constant $N_c$ (205, FIG. 2), representing the ratio of the RF to PRF frequencies, as described there and illustrated by FIG. 1 and 20 FIG. 2, provides the means for performing emitter location against a radar being blinked. The measurement of this constant may have been done previously by other observers, since for many pulse amplifier radars it represents a product of scale factors used in the radar's frequency synthesis circuit (25, FIG. 2), and so is invariant from day to day. Previous estimation of this constant, and from it the emitter RF and PRF rest frequencies, also allows the passive Doppler ranging method of this invention to extract emitter relative bearing from time and frequency measurements made during single dwells.

For all pulsed echo radars this fundamental constant 205 FIG. 2 is the number of carrier cycles $N_c$ that occur in the time interval $1/f_{PRF}$ where $f_{PRF}$ is the fundamental pulse repetition frequency. This time interval is subsequently referred to as $t_p$. Intrinsic to this invention is the relation 210 FIG. 2 of $N_c$ to the observer's acceleration along the signal's direction-of-arrival (DOA), and to changes in the carrier frequency f and $t_p$:

$$\Delta t_p \Delta f = -N_c \left( \frac{\ddot{r}}{c} \Delta t \right)^2 \quad (1)$$

In a sense, $N_c$ takes the place of the unknown rest frequencies in Equation (2), and provides the key to doing passive Doppler emitter angular location from measurements made in a single dwell, as opposed to multiple dwells made during precisely executed doglegs, as required by the Shaw patent. This and other aspects of the invention will be clear from the following detailed description.

DETAILED DESCRIPTION OF THE PREFERRED EMBODIMENTS

Figure 1:
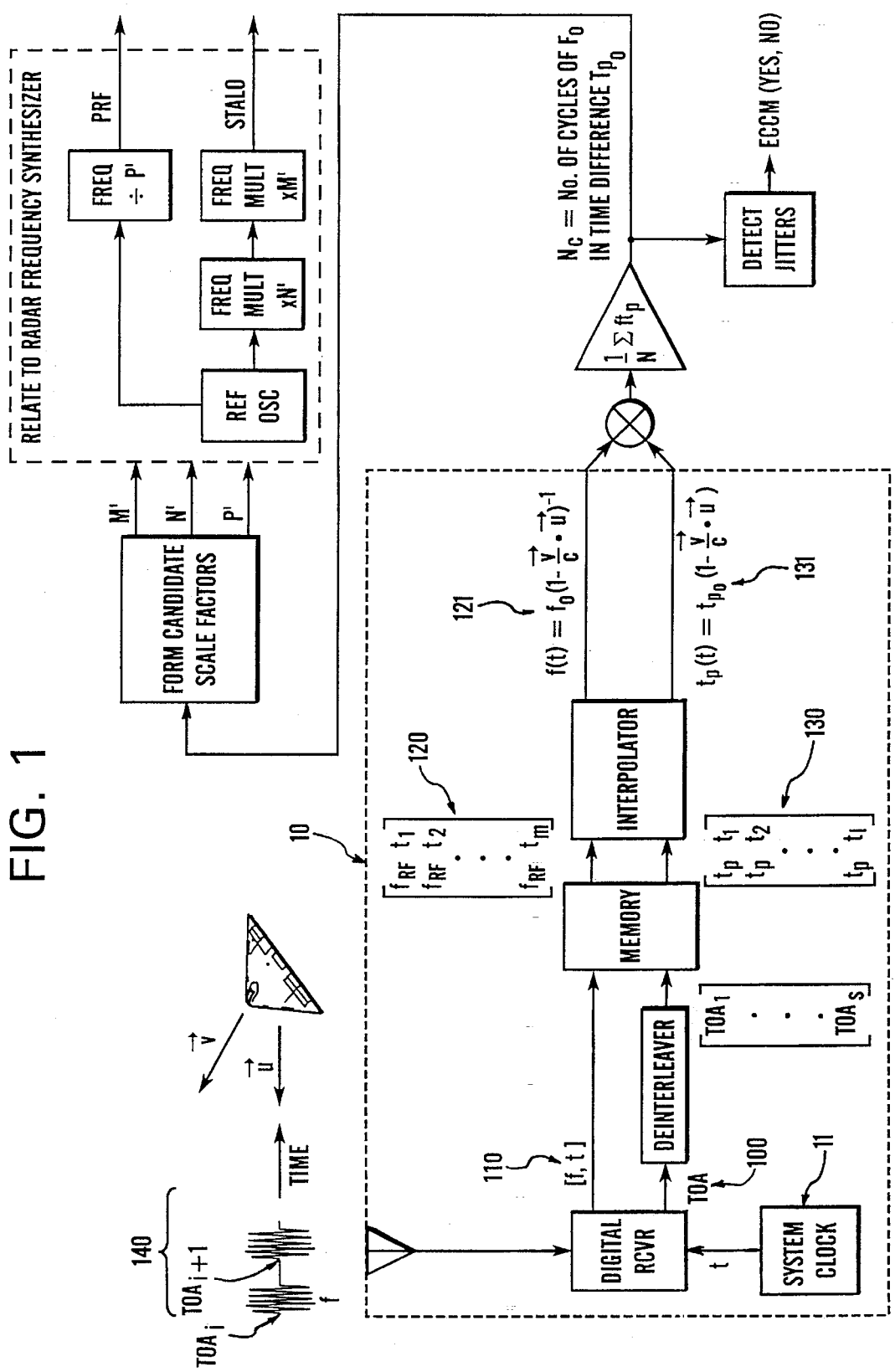
FIG. 1 is a schematic diagram showing the system described in application Ser. No. 08/499,825 for estimating the relativistic constant $N_c$ using no NAV inputs.

FIG. 1 shows the aspects of the $f/f_{PRF}$ measurement relevant to this invention. A more detailed description of the FIG. 1 system may be found in the above referenced application Ser. No. 08/499,825. Essentially, pulse time-of-arrival 100 (TOA) and frequency measurements 110 are made during a single dwell. Reference numeral 120 represents the total set of frequency measurements made, in this case m in number. The reference 130 represents the set of $t_p=1/f_{PRF}$ measurements extracted from the TOA measurements during the dwell. For RF carrier frequency f121 and $t_p$ 131 simultaneous in time, the product $ft_p$ is the number of cycles of the RF occurring in the time difference $t_p$. This product can be related to the frequency synthesis circuit 25 (FIG. 2) in many pulse amplifier radars, and in important cases for not frequency agile radar represents a fixed value that does not change if the radar is blinked when the $t_p$ time difference is the greatest common divisor of all the interpulse time intervals. As discussed in the above referenced patent application, this fundamental constant requires no NAV inputs for its measurement, the NAV inputs being replaced by the system clock (11, FIG. 1). Therefore, estimation of this constant is especially adapted to UAVs, with their primitive navigation systems. The accuracy of the estimate can be brought to any refinement desired since it is the same constant for all measurements made on a given frequency stable emitter. In particular, if the emitter turns on and off as a countermeasure, the constant can be estimated from the sparse data collected over an extended time. This invention relates this constant to kinematical quantities involved in the observer's motion relative to the emitter, and thence to the emitter range, bearing and time-to-go, as described next.

Figure 2:
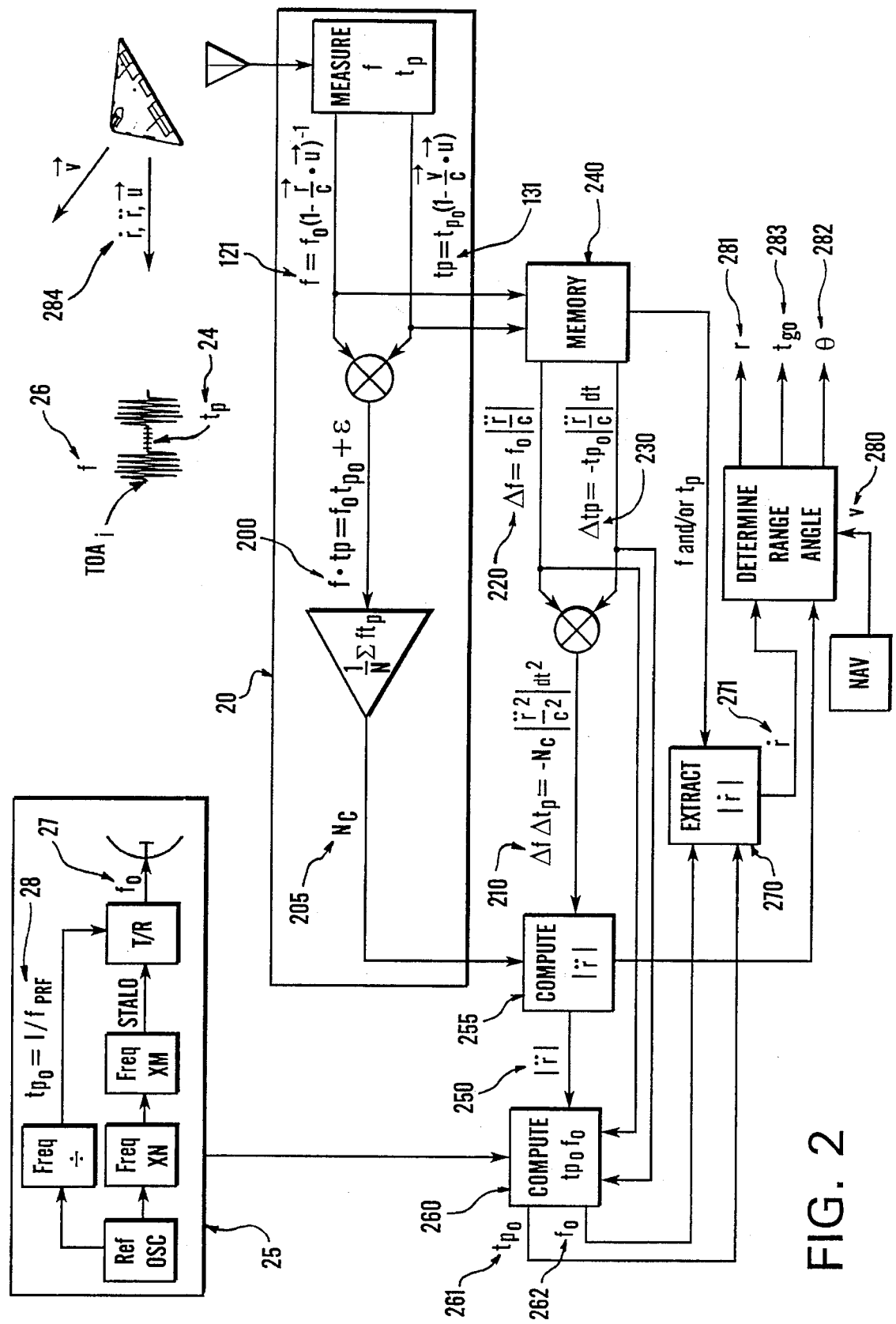
FIG. 2 is a block-schematic diagram of a preferred embodiment of the invention which uses the aforementioned relativistic constant, pulse TOA and emitter frequency measurements to derive emitter location, emitter rest frequencies, and time-to-go.

FIG. 2 illustrates a preferred embodiment of the invention. Whereas the estimation of the constant $ft_p$ takes place over one dwell, the estimation of the product $\Delta f \Delta t_p$ takes place typically over two dwells. The f and $t_p$ estimates from each dwell are stored in memory 240, and then the two sets differenced by subtracting the measurements in the $(i-1)^{th}$ dwell from those in the $i^{th}$. The differenced frequency is accurately approximated by $$\Delta f = -f_o \left| \frac{\ddot{r}}{c} \right| \Delta t \quad (2a)$$

where $\ddot{r}$-the acceleration of the observer along the emitter DOA $f_o$-the emitter RF rest frequency c-speed of light $\Delta t$-time seperating differenced measurements and the differenced time interval is $$\Delta t_p = t_{p_o} \left| \frac{\ddot{r}}{c} \right| \Delta t \quad (2b)$$

with $$t_{p_o} = \frac{1}{\text{rest PRF frequency}} .$$

The product of Equation (2a) and Equation (2b), 210 FIG. 2, involves the fundamental constant $f_o t_{po} = N_c$ which is known, rather than the unknown individual quantities $f_o$ and $t_{po}$, and hence the acceleration 250 toward the emitter can be estimated 255 by $$\ddot{r} = c \left( \frac{\Delta f \Delta t_p}{-N_c} \right)^{1/2} (\Delta t)^{-1} \quad (3)$$

Once the acceleration 250 is known, the individual quantities 262 $f_o$ and 261 $t_{po}$ can be found via the measurements 121 and 131 FIG. 2. These rest quantities are stable for emitters conducive to passive Doppler location, and hence are valuable as radar classification parameters. They can be estimated by an observer over an extended time and then used by another observer to obtain emitter relative bearing on frequency or time measurements made in a single dwell as described next. Since no NAV input was used in their estimation, they are parameters well suited to measurement by a UAV for use in subsequent rapid emitter location by a high performance attack aircraft.

The next kinematical quantity to be estimated 270 is the observer velocity 271 along the emitter signal DOA. This quantity is estimated during the actual location of the emitter, although as just noted the emitter rest parameters used may have been estimated some time previously on another platform. This quantity is found from the measured, Doppler shifted frequency 121, or time difference 131 measurements by the approximation $$\dot{r} = c \left( \frac{f - f_o}{f_o} \right) \quad (4)$$

or by the exact equation $$\dot{r} = -c \left( \frac{t_p - t_{p_o}}{t_{p_o}} \right) \quad (5)$$

It can also be obtained by an average of these two equations. Such averaging is desirable when the errors on the frequency and time difference measurement are uncorrelated.

Once this quantity is known the range r and relative bearing θ are found from the kinematical relations $$r = \frac{v^2 - \dot{r}^2}{\ddot{r}} \quad (6a)$$

and

-continued $$\theta = \arccos\left(\frac{r}{v}\right) \quad (6b)$$

where v is the observer speed. This scaler quantity v is the only NAV input required, and it is only required for the final estimation of range. Finally, time-to-go is found from $$t_{go} = \frac{r}{\dot{r}} \quad (7)$$

The above description shows the relationship between the quantities measured and estimated, and in particular the important physical relationship 210 (Equation 1) between the fundamental time-frequency product measured in 20, FIG. 2, and the observer acceleration. The estimation of the acceleration from this relation via Equation (3) allows emitter relative bearing to be found from a single frequency measurement 121, or time difference measurement 131, or set of such measurements in a single dwell.

This can be more clearly seen by rewriting Equation (6) as an explicit function of the time and frequency measurements:

$$r = \Delta t \left(\frac{N_c}{\Delta t_p \Delta f}\right) \left(\frac{c}{2} \left(\left(\frac{t_p - t_{p_o}}{t_{p_o}}\right)^2 + \left(\frac{f - f_o}{f_o}\right)^2\right) - \frac{v^2}{c}\right) \quad (8a)$$

$$\theta = \arccos\left(\frac{\frac{c}{2}\left(\left(\frac{t_p - t_{p_o}}{t_{p_o}}\right)^2 + \left(\frac{f - f_o}{f_o}\right)^2\right)^{1/2}}{v}\right) \quad (8b)$$

From Equation (8b) it is clear that once $N_c$, and thence $f_o$ and $t_{po}$ are known, relative bearing $\theta$ can be found using measurements made in a single dwell. These angle estimates can be used even when the emitter is blinked, or blocked for an extended time by terrain, since the angle estimates in widely spaced dwells provide a means to do bearings-only passive location of the emitter, even if Equation (8a) cannot be used.

Equation (8a) also indicates the use of a simple average based on Equation (4) and Equation (5) to estimate $\dot{r}$. It will be clear to those skilled in the art that more elaborate estimation schemes can be used to extract all the estimated quantities than those shown, which were purposefully put in a simple algebraic form to aid the exposition.

I claim:

1. A method for passively locating a pulse echo radar emitter using Doppler measurement techniques from a moving observer, comprising the steps of:

first, measuring the emitter's pulse carrier frequency (f), second, measuring emitter pulse time of arrival at the observer (TOA), storing the results of said first and second measurements of sets of multiple contiguous pulses over a predetermined time period, each set being a dwell, deriving a fundamental time period ($t_p$) from said measurements in a dwell, calculating the differences respectively in the first measurements and the fundamental time period $t_p$ derived from the second measurements between two dwells, on the basis of said calculated differences estimating the simultaneous frequency and time differences, multiplying said simultaneous estimates of said differences, estimating the simultaneous values of frequency and $t_p$, multiplying the simultaneous values of frequency and $t_p$ and averaging the results to obtain an estimate of the number of carrier cycles ($N_c$), which occur in a time interval ($t_p$) equal to the reciprocal of the emitter's pulse repetition frequency, measuring, using the product of said calculated differences and $N_c$, the observer's acceleration along the path of emitter signal direction of arrival (DOA), computing, using said measured acceleration, the value of $t_p$ at the emitter ($t_{po}$) and the rest frequency at the emitter ($f_o$), using values of $t_{po}$, $f_o$ and said first and second measurements in the same dwell to compute the observer's velocity along the emitter DOA, measuring, in a third measurement step, the observer speed (v) at the time said first and second and combining v and the acceleration and velocity along the emitter signal DOA to obtain emitter range, relative bearing and time-to-go.

2. The method of claim 1 wherein the emitter range r and bearing $\theta$ relative to the observer velocity vector are computed according to $$r = \Delta t \left(\frac{N_c}{\Delta t_p \Delta f}\right) \left(\frac{c}{2}\left(\left(\frac{t_p - t_{p_o}}{t_{p_o}}\right)^2 + \left(\frac{f - f_o}{f_o}\right)^2\right) - \frac{v^2}{c}\right)$$

and $$\theta = \arccos\left(\frac{\frac{c}{2}\left(\left(\frac{t_p - t_{p_o}}{t_{p_o}}\right)^2 + \left(\frac{f - f_o}{f_o}\right)^2\right)^{1/2}}{v}\right).$$

3. The method of claim 1 wherein the values $N_c$, $f_o$ and $t_{po}$ are provided from previous observations of the emitter and are used to locate the emitter in angle from frequency and pulse time estimates made in a single dwell comprising the additional steps of:

storing the previously estimated values of $N_c$, $f_o$, and $t_{po}$, computing $N_c$ from measurements in a single dwell, and comparing this computed value with the stored value to verify emitter classification, computing emitter angle location by using the stored measurements $N_c$, $f_o$, and $t_{po}$, and the frequency and time measurements f and $t_p$ made in a single dwell, by $$\theta = \arccos\left(\frac{\frac{c}{2}\left(\left(\frac{t_p - t_{p_o}}{t_{p_o}}\right)^2 + \left(\frac{f - f_o}{f_o}\right)^2\right)^{1/2}}{v}\right).$$

4. The method of claim 3 wherein multiple relative bearing measurements, each made on a different single dwell, are used by a bearings-only estimator to locate the emitter in range.

5. The method of claim 3, wherein frequency difference and time difference measurements are made between frequency and pulse TOA measurements made in contiguous dwells, and range then computed by $$r = \Delta t \left(\frac{N_c}{\Delta t_p \Delta f}\right) \left(\frac{c}{2}\left(\left(\frac{t_p - t_{p_o}}{t_{p_o}}\right)^2 + \left(\frac{f - f_o}{f_o}\right)^2\right) - \frac{v^2}{c}\right).$$

6. Apparatus for locating a pulse echo radar emitter from a moving observer using Doppler techniques, comprising:

means for measuring the emitter's pulse carrier frequency (f) and producing a corresponding first measurement signal, means for measuring the pulse time of arrival (TOA) of the radar signal from the emitter and producing a corresponding second measurement signal, first storage means for storing said first and second measurement signals for sets of multiple, contiguous pulses occurring over a predetermined time period, each set corresponding to a dwell means for deriving from said second measurement signal a third measurement signal corresponding to a time period ($t_p$) for the emitter's fundamental pulse repetition frequency, differencing means for calculating the differences between said first measurement signals and said third measurement signals, respectively, in a dwell to produce fourth and fifth measurement signals corresponding to simultaneously occurring frequency and time differences, first multiplier means for producing a first product signal from said fourth and fifth measurement signals, second multiplier means for producing a second product signal ($f\, t_p$) from simultaneous values of said first and third measurement signals to thereby obtain an estimated value for the number of carrier cycles ($N_c$) occurring in the time period $t_p$, first computing means for determining the acceleration of the observer along the path of the emitter's signal direction of arrival (DOA) from said first product signal and said second product signal, second computing means for using the acceleration value determined by said first computing means to compute the fundamental pulse repetition period at the emitter ($t_{po}$) and the carrier rest frequency ($f_o$)

third computing means for using the computed $t_{po}$ and $f_o$ values from said second computing means to compute the observer's velocity along the emitter signal DOA path, navigation instruments means for providing a sixth measurement signal corresponding to the observer's actual speed (v) at the time the measurements in the dwell were made, and fourth computing means for using said sixth measurement signal and the results from said first and third computing means to determine emitter range, relative bearing and time-to-go.

7. The apparatus described in claim 6 further comprising:

second storage means for storing values of $N_c$, $f_o$ and $t_{po}$ from previous observations of the emitter and comparator means for comparing the values in said second storage means with said second product signal to determine emitter classification.

* * * * *